US012585440B2

(12) United States Patent
Patel et al.

(10) Patent No.: US 12,585,440 B2
(45) Date of Patent: Mar. 24, 2026

(54) METHOD AND SYSTEM FOR MACHINE LEARNING BASED INTEGRATION OF BOTS

(71) Applicant: Tata Consultancy Services Limited, Mumbai (IN)

(72) Inventors: Nimesh Shivabhai Patel, Gandhinagar (IN); Shreekant Waman Shiralkar, Thane West (IN); Zubeena Shireen Sheikh, Gandhinagar (IN); Dhairya Maulesh Dholakia, Gandhinagar (IN); Drashti Vijaybhai Patel, Gandhinagar (IN)

(73) Assignee: Tata Consultancy Services Limited, Mumbai (IN)

( * ) Notice: Subject to any disclaimer, the term of this patent is extended or adjusted under 35 U.S.C. 154(b) by 274 days.

(21) Appl. No.: 18/429,115

(22) Filed: Jan. 31, 2024

(65) Prior Publication Data

US 2024/0264808 A1 Aug. 8, 2024

(30) Foreign Application Priority Data

Feb. 3, 2023 (IN) .............................. 202321006932

(51) Int. Cl.
G06F 8/35 (2018.01)
G06F 8/36 (2018.01)
(52) U.S. Cl.
CPC . G06F 8/35 (2013.01); G06F 8/36 (2013.01)
(58) Field of Classification Search
None
See application file for complete search history.

(56) References Cited

U.S. PATENT DOCUMENTS 10,861,442 B2 * 12/2020 Manoharan ............. G06F 9/453
11,146,598 B1 * 10/2021 Palihakkara ............ H04L 51/02
(Continued)

FOREIGN PATENT DOCUMENTS

KR 20200056541 A 5/2020

OTHER PUBLICATIONS

Klopfenstein, "The Rise of Bots: A Survey of Conversational Interfaces, Patterns, and Paradigms", 2017, ACM (Year: 2017).*

*Primary Examiner* — Hossain M Morshed
(74) *Attorney, Agent, or Firm* — Finnegan, Henderson, Farabow, Garrett & Dunner, LLP

(57) ABSTRACT

Developing a new solution or revising an existing solution to meet organizational requirements is often time consuming. One solution to overcome the above problem is to integrate existing solution providers like bots without affecting the overall performance. Conventional methods integrate bots performing similar operations. To overcome the challenges in the conventional approaches, the present disclosure provides a method and system for Machine learning (ML) based integration of bots. The present disclosure integrates a plurality of dissimilar bots using ML approach. Further, the present disclosure enables an end-user to combine two or more similar or dissimilar bots using an interface. The end-user/user can create, combine, validate and test the combined dissimilar bots without any prior knowledge of programming. Furthermore, the present disclosure auto-recommends the end-user regarding which bots can be combined with the selected bots by checking the technical and end-user feasibility.

15 Claims, 6 Drawing Sheets

(56)                   References Cited

U.S. PATENT DOCUMENTS

| | | | | |
|---|---|---|---|---|
| 11,895,062 B2* | 2/2024 | Yannam | ................. | H04L 51/02 |
| 2023/0405825 A1* | 12/2023 | Nobuhara | ................. | B25J 9/16 |
| 2024/0264808 A1* | 8/2024 | Patel | ................. | G06N 3/0895 |

* cited by examiner

200

Bots to be integrated

End-user bot compatibility value
computation module 202

Technical compatibility value
generation module 204

Dynamic compatibility matrix
updating module 206

Bot integration module 208

300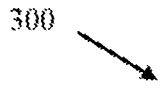

302
receive at least two bots selected by a user from a bot repository as input, wherein each bot comprises a plurality of bot features 304
compute an end-user bot compatibility value for the at least two bots based on a corresponding plurality of bot features using a trained classifier, wherein the end-user compatible value is set to one only if the corresponding end-user bot compatibility score is greater than a predefined threshold 306
generate a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots 308
update a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise 310
create a bot package by integrating the at least two bots based on the dynamic compatibility matrix, wherein the bot package is created only if a corresponding entry between the at least two bots in the dynamic compatibility matrix is set to one

FIG. 3

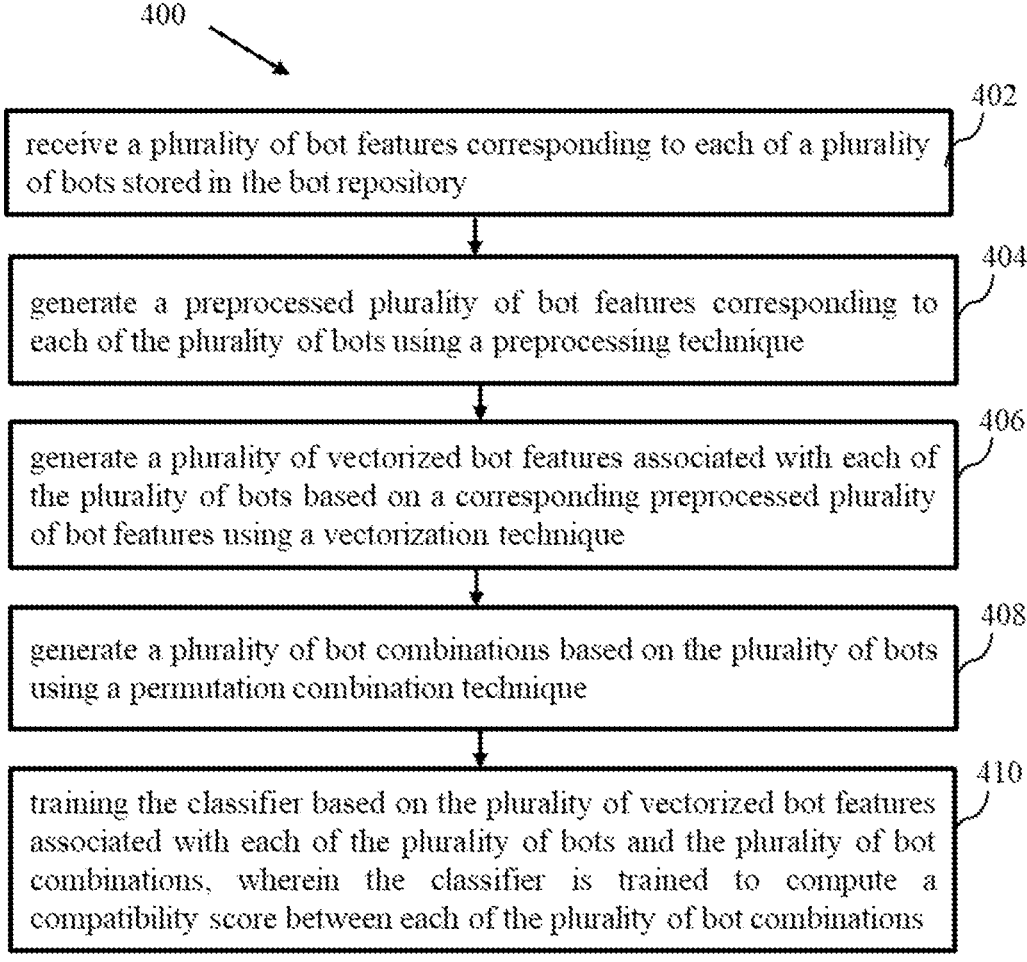

400 receive a plurality of bot features corresponding to each of a plurality of bots stored in the bot repository    402 generate a preprocessed plurality of bot features corresponding to each of the plurality of bots using a preprocessing technique    404 generate a plurality of vectorized bot features associated with each of the plurality of bots based on a corresponding preprocessed plurality of bot features using a vectorization technique    406 generate a plurality of bot combinations based on the plurality of bots using a permutation combination technique    408 training the classifier based on the plurality of vectorized bot features associated with each of the plurality of bots and the plurality of bot combinations, wherein the classifier is trained to compute a compatibility score between each of the plurality of bot combinations    410

FIG. 4

METHOD AND SYSTEM FOR MACHINE LEARNING BASED INTEGRATION OF BOTS

PRIORITY CLAIM

This U.S. patent application claims priority under 35 U.S.C. § 119 to: Indian Patent Application No. 202321006932, filed on Feb. 3, 2023. The entire contents of the aforementioned application are incorporated herein by reference.

TECHNICAL FIELD

The disclosure herein generally relates to the field of Machine Learning (ML) and, more particularly, to a method and system for ML based integration of bots.

BACKGROUND

Perpetuity of change caused by innovative technologies necessitate a continuous change in requirements and scope of application of software solutions. Development of a new solution or revising of an existing one, to meet the change in requirements and/or scope of application is often time consuming. One solution to overcome the above problem is to integrate existing solution providers without affecting the overall performance. For example, considering a procurement process in an enterprise which includes multiple bots handling a specific application like email processing, Optical Character Recognition (OCR), Enterprise Resource Planning (ERP) and Information Technology Service Management (ITSM). These bots can be combined to provide a holistic solution in the procurement process.

Conventional method for integrating bots is performed among chatbots which are designed to carry out a natural language conversion. For example, user enters a text in Natural Language (NL) and the chatbot provides an answer. In this case, a set of chat bots are selected based on user query. Here the chatbots performs only NL based conversions, which means the conventional methods are integrating the bots, especially the chatbots which are meant to perform similar operations. Hence it is challenging to integrate bots which are performing dissimilar tasks such as procurement process discussed in the previous paragraph.

SUMMARY

Embodiments of the present disclosure present technological improvements as solutions to one or more of the above-mentioned technical problems recognized by the inventors in conventional systems. For example, in one embodiment, a method for Machine learning (ML) based integration of bots. The method includes receiving, by one or more hardware processors, at least two bots selected by a user from a bot repository as input, wherein each bot comprises a plurality of bot features. Further, the method includes computing an end-user bot compatibility value for the at least two bots based on a corresponding plurality of bot features using a trained classifier, wherein the end-user compatible value is set to one only if the corresponding end-user bot compatibility score is greater than a predefined threshold. Furthermore, the method includes generating a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots. Furthermore, the method includes updating a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise. Finally, the method includes creating a bot package by integrating the at least two bots based on the dynamic compatibility matrix, wherein the bot package is created only if a corresponding entry between the at least two bots in the dynamic compatibility matrix is set to one.

In another aspect, a system for Machine learning (ML) based integration of bots. The system includes at least one memory storing programmed instructions, one or more Input/Output (I/O) interfaces, and one or more hardware processors operatively coupled to the at least one memory, wherein the one or more hardware processors are configured by the programmed instructions to receive at least two bots selected by a user from a bot repository as input, wherein each bot comprises a plurality of bot features. Further, the one or more hardware processors are configured by the programmed instructions to compute an end-user bot compatibility value for the at least two bots based on a corresponding plurality of bot features using a trained classifier, wherein the end-user compatible value is set to one only if the corresponding end-user bot compatibility score is greater than a predefined threshold. Furthermore, the one or more hardware processors are configured by the programmed instructions to generate a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots. Furthermore, the one or more hardware processors are configured by the programmed instructions to update a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise. Finally, the one or more hardware processors are configured by the programmed instructions to create a bot package by integrating the at least two bots based on the dynamic compatibility matrix, wherein the bot package is created only if a corresponding entry between the at least two bots in the dynamic compatibility matrix is set to one.

In yet another aspect, a computer program product including a non-transitory computer-readable medium having embodied therein a computer program for Machine learning (ML) based integration of bots. The computer readable program, when executed on a computing device, causes the computing device to receive at least two bots selected by a user from a bot repository as input, wherein each bot comprises a plurality of bot features. Further, the computer readable program, when executed on a computing device, causes the computing device to compute an end-user bot compatibility value for the at least two bots based on a corresponding plurality of bot features using a trained classifier, wherein the end-user compatible value is set to one only if the corresponding end-user bot compatibility score is greater than a predefined threshold. Furthermore, the computer readable program, when executed on a computing device, causes the computing device to generate a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots. Furthermore, the computer readable program, when executed on a computing device, causes the computing device to update a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise. Finally, computer readable program, when executed on a computing device, causes the computing device to create a bot package by integrating the at least two bots based on the dynamic compatibility matrix, wherein the bot package is created only if a corresponding entry between the at least two bots in the dynamic compatibility matrix is set to one.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 is an exemplary flow diagram illustrating a processor implemented method 300 for ML based integration of bots implemented by the system of FIG. 1 according to some embodiments of the present disclosure.

FIG. 4 is an exemplary flow diagram for training a classifier for the processor implemented method for ML based integration of bots implemented by the system of FIG. 1 according to some embodiments of the present disclosure.

DETAILED DESCRIPTION

Figure 1:
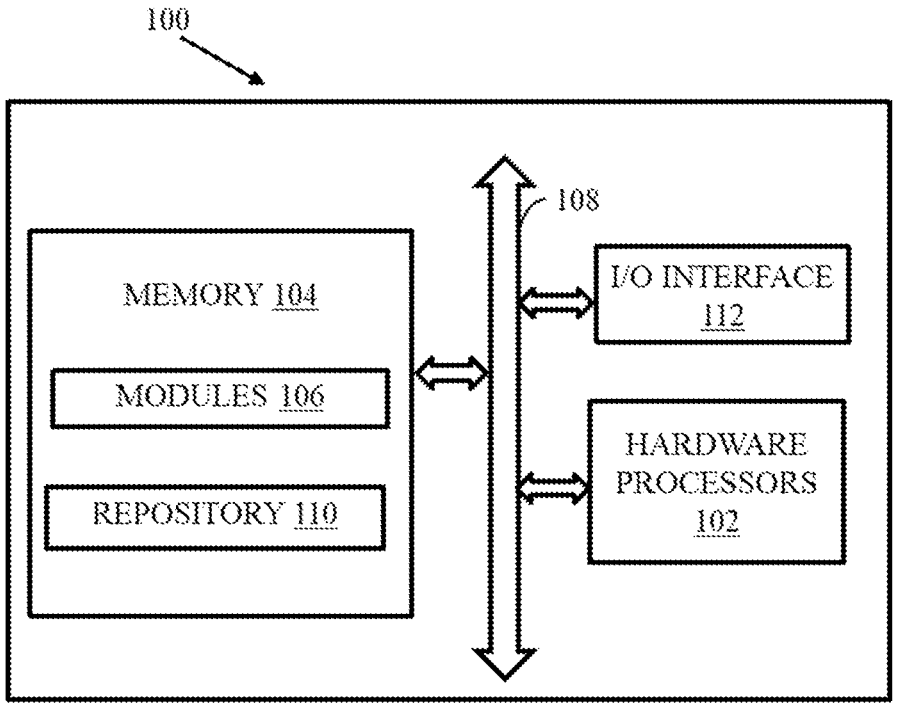
FIG. 1 is a functional block diagram of a system for Machine Learning (ML) based integration of bots, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Developing a new solution or revising an existing solution to meet organizational requirements is often time consuming. One solution to overcome the above problem is to integrate existing solution providers without affecting the overall performance. For example, considering a procurement process in an enterprise which includes multiple bots handling a specific application like email processing, Optical Character Recognition (OCR), Enterprise Resource Planning (ERP) and Information Technology Service Management (ITSM). These bots can be combined to provide a holistic solution in the procurement process. Conventional method for integrating bots is performed among the chatbots which are meant to perform similar operations. Hence it is challenging to integrate bots which are performing dissimilar tasks such as procurement process discussed in the previous paragraph.

To overcome the challenges in the conventional approaches, embodiments herein provide a method and system for Machine learning (ML) based integration of bots. The present disclosure integrates a plurality of similar or dissimilar bots using ML approach. In an embodiment, the present disclosure enables an end-user to combine two or more similar or dissimilar bots using an interface, for example a Graphical User Interface (GUI). The end-user/ user can create, combine, validate, and test the combined similar or dissimilar bots without any prior knowledge of programming. Further, the present disclosure auto-recommends the end-user regarding which bots can be combined with the selected bots by checking the technical and end-user feasibility.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of a system 100 for ML based integration of bots, in accordance with some embodiments of the present disclosure. The system 100 includes or is otherwise in communication with hardware processors 102, at least one memory such as a memory 104, and an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 2:
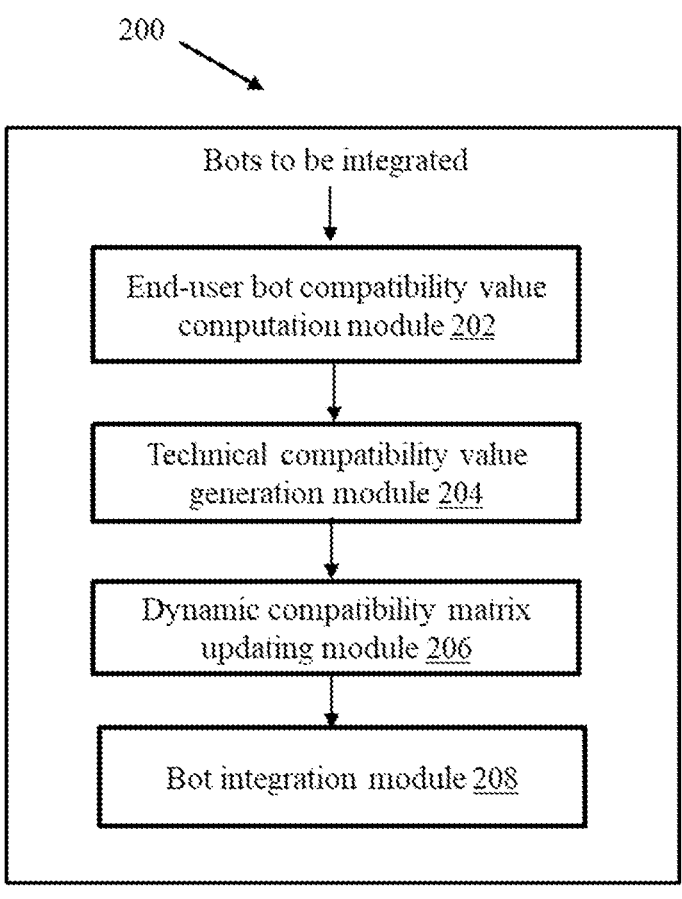
FIG. 2 illustrates a functional architecture of the system of FIG. 1, for ML based integration of bots, in accordance with some embodiments of the present disclosure.

The plurality of modules 106 include programs or coded instructions that supplement applications or functions performed by the system 100 for Machine learning (ML) based integration of bots. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the ML based integration of bots. In an embodiment, the modules 106 includes an end-user compatibility value computation module (shown in FIG. 2), a technical compatibility value generation module (shown in FIG. 2), a dynamic compatibility matrix updating module (shown in FIG. 2) and a bot integration module (shown in FIG. 2). In an embodiment, FIG. 2 illustrates a functional architecture of the system of FIG. 1, for ML based integration of bots, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 3, FIG. 6A and FIG. 6B.

FIG. 3 is an exemplary flow diagram illustrating a method 300 for ML based integration of bots implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 300 by the one or more hardware processors 102. The steps of the method 300 of the present disclosure will now be explained with reference to the components or blocks of the system 100 as depicted in FIG. 1 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive at least two bots selected by a user from a bot repository as input, wherein each bot comprises a plurality of bot features. The bot integration disclosed in the present disclosure required minimum two bots and hence a greater number of bots can be integrated in a similar fashion. A bot is a set of instructions or software designed to handle one business task. For example, the at least two bots for integration be a bot for "Purchase order creation" and a bot for "status check of a purchase order".

At step 304 of the method 300, the end-user compatibility value computation module 202 executed by one or more hardware processors 102 is configured by the programmed instructions to compute an end-user bot compatibility value for the at least two bots based on a corresponding plurality of bot features using a trained classifier. For example, the classifier is a Naïve Bayes model and similar other models can be used. The end-user compatible value is set to one only if the corresponding end-user bot compatibility score is greater than a predefined threshold. For example, the plurality of bot features includes a bot name, a plurality of input features, a plurality of output features, a datatype associated with each of the plurality of input features, a datatype associated with each of the plurality of output features and a bot category. For example, an "Invoice Processing bot" includes a bot name as "Invoice Processing", input as "invoice" which is a file can be a scanned image or a document, the output features include variables like "company name" which is a alphanumeric string, "date" which is a string, "amount" which is numeric, "invoice number" which is a numeric and the bot belongs to "Optical Character Recognition (OCR)" category.

In an embodiment, the steps for training the classifier to compute an end-user bot compatibility value is explained in conjunction with the flow diagram given in FIG. 4.

FIG. 4 is an exemplary flow diagram for training a classifier for the processor implemented method for ML based integration of bots implemented by the system of FIG. 1 according to some embodiments of the present disclosure.

Now referring to FIG. 4, at step 402 of the method 400, the one or more hardware processors 102 are configured by the programming instructions to receive a plurality of bot features corresponding to each of a plurality of bots stored in the bot repository. For example, the plurality of bot features comprises the bot name, the plurality of input features, the plurality of output features, the datatype associated with each of the plurality of input features, the datatype associated with each of the plurality of output features and the bot category.

At step 404 of the method 400, the one or more hardware processors 102 are configured by the programming instructions to generate a preprocessed plurality of bot features corresponding to each of the plurality of bots using a preprocessing technique. The preprocessing includes lower case conversion, tokenization, removing filler words, numbers and special characters, lemmatization.

At step 406 of the method 400, the one or more hardware processors 102 are configured by the programming instructions to generate a plurality of vectorized bot features associated with each of the plurality of bots based on a corresponding preprocessed plurality of bot features using a vectorization technique. For example, the vectorization technique used here is Term Frequency-Inverse Document Frequency (TF-IDF) vectorization technique.

At step 408 of the method 400, the one or more hardware processors 102 are configured by the programming instructions to generate a plurality of bot combinations based on the plurality of bots using a permutation combination technique.

At step 410 of the method 400, the one or more hardware processors 102 are configured by the programming instructions to train the classifier based on the plurality of vectorized bot features associated with each of the plurality of bots and the plurality of bot combinations. The classifier is trained to compute a compatibility score between each of the plurality of bot combinations.

Now referring to FIG. 3, at step 306 of the method 300, the technical compatibility value generation module 204 executed by the one or more hardware processors 102 is configured by the programmed instructions to generate a technical compatibility value of the at least two bots based on the plurality of input features and the plurality of output features associated with the at least two bots. The technical compatibility value is set to one only if the plurality of output features of a first bot from among the at least two bots is equal to the plurality of input features associated with the second bot from among the at least two bots. For example, considering a bot 1 having the plurality of output features as "purchase order number", "date of creation" and a bot 2 with the plurality of input features as "purchase order number". Here, the output features of the bot 1 and the input features of bot 2 are similar and hence the technical compatibility for the bot 1 and bot 2 is set to one.

At step 308 of the method 300, the dynamic compatibility matrix updating module 206 executed by the one or more hardware processors 102 is configured by the programmed instructions to update a dynamic compatibility matrix with the at least two bots based on the end-user bot compatibility value and the technical compatibility value. The dynamic compatibility matrix is updated with a value one if the end-user compatibility value and the technical feasibility value are set to one and zero otherwise. An example dynamic compatibility matrix is given in table 1. Now referring to Table I. the value '0' indicates non-compatibility and the value '1' indicated compatibility. For example, the entry between Bot 1 and Bot 2 is '1', which means that the Bot 1 and Bot 2 are satisfying both end-user compatibility and the technical compatibility.

TABLE I

|  | Bot 1 | Bot 2 | Bot 3 | Bot 4 |
|---|---|---|---|---|
| Bot 1 | 0 | 1 | 0 | 1 |
| Bot 2 | 0 | 0 | 1 | 1 |
| Bot 3 | 1 | 0 | 0 | 1 |
| Bot 4 | 1 | 1 | 0 | 0 |

At step 310 of the method 300, the bit integration module 208 executed by the one or more hardware processors 102 is configured by the programmed instructions to create a bot package by integrating the at least two bots based on the dynamic compatibility matrix, wherein the bot package is created only if a corresponding entry between the at least two bots in the dynamic compatibility matrix is set to one. For example, bot package can be created with Bot 1 and Bot 2 since the corresponding entry in the dynamic compatibility matrix is set to one.

Figure 5:
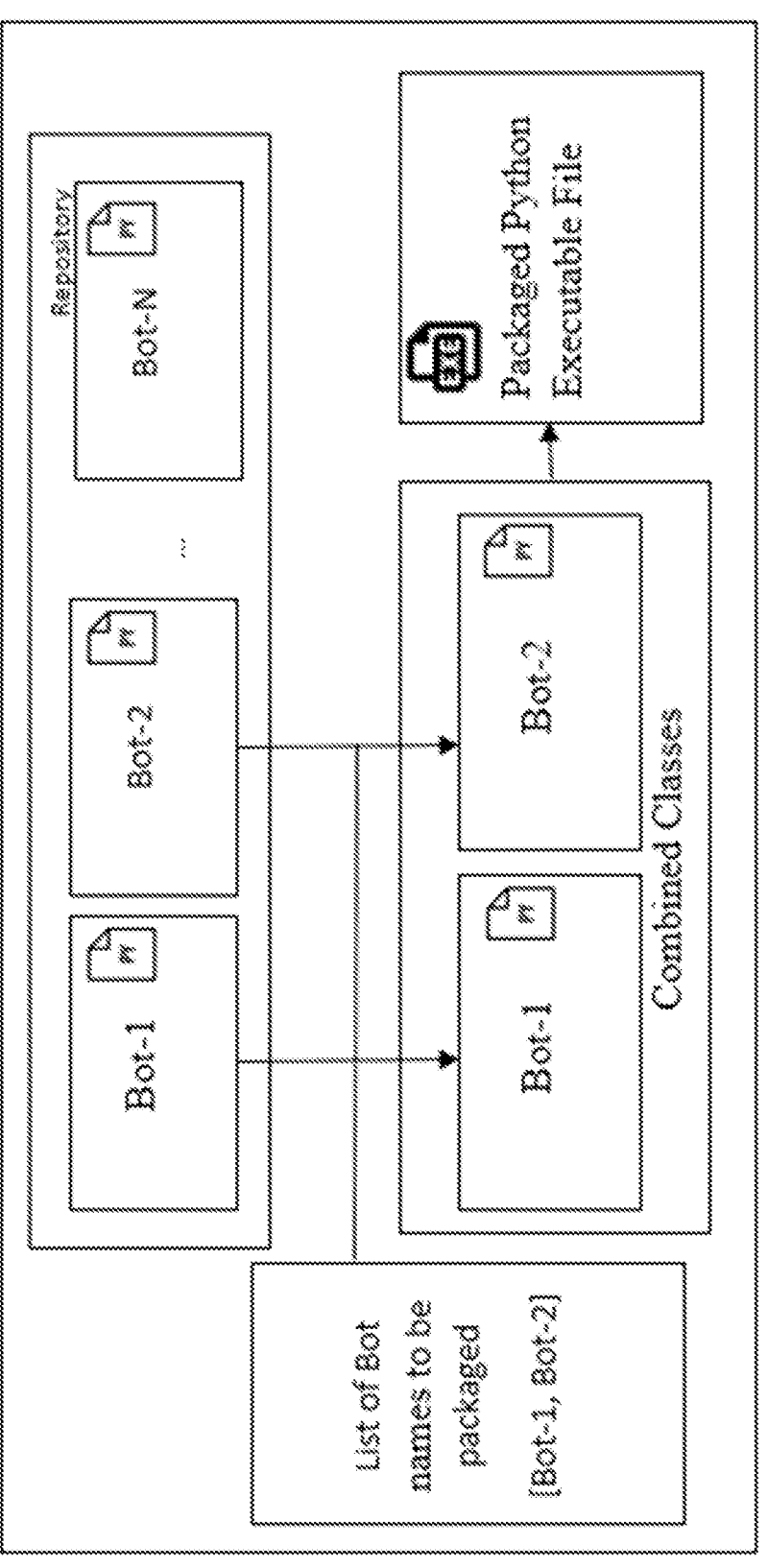
FIG. 5 illustrates an exemplary functional architecture for bot integration and packaging for the processor implemented method for ML based integration of bots implemented by the system of FIG. 1 according to some embodiments of the present disclosure.

In an embodiment, integrating the at least two bots include the following steps as illustrated in FIG. 5. Now referring to FIG. 5, initially, a list of bot names (L) of the at least two bots are traversed. Further, a search for python class with bot name (b) is performed. The copy of the python class (b) is appended to a python file (F) to generate the file F and the above 3 steps are repeated for all elements of list L. Further the file (F) is converted into executable file and compressed using a compression technique.

In an embodiment, the packaging of code is triggered when user selects the download option from the screen or GUI (Graphical User Interface). The screen includes the results of execution of the union of bots and a download option. The list of bots in the union are transferred to the backend. This list has the names of the bots in the current union that was just executed. The python classes for the respective bots are collected as one python file. It's then zipped as a zip file and is downloaded on the user's device.

In an embodiment, the present disclosure auto recommends a plurality of bots to the user using a Graph Neural Network (GNN) based self-learning model, wherein the GNN based self-learning model is associated with the dynamic compatibility matrix comprising compatibility values of the plurality of bots.

In an embodiment, the training data for the GNN model is represented in an unordered graph like structure preserving information about the neighboring nodes. Each node represents a bot. It has features as defined in the Input variables in the previous section. A graph like structure is then formed using this information. It includes an adjacency matrix as given below for preserving information on the connection of each node (bot) with the other nodes (bots). Now referring to the adjacency matrix, $i_{jk}=0$ or 1; represents connection between j and k nodes in the graph and the like.

$$\begin{pmatrix} & \text{Node1} & \text{Node2} & \text{Node3} & \dots & \text{Node } N \\ \text{Node1} & i_{11} & i_{12} & i_{13} & \dots & i_{1N} \\ \text{Node2} & i_{21} & i_{22} & i_{23} & \dots & i_{2N} \\ \text{Node3} & i_{31} & i_{32} & i_{33} & \dots & i_{3N} \\ \vdots & & & & & \\ \text{Node } N & i_{N1} & i_{N2} & i_{N3} & \dots & i_{NN} \end{pmatrix}$$

Figure 6:
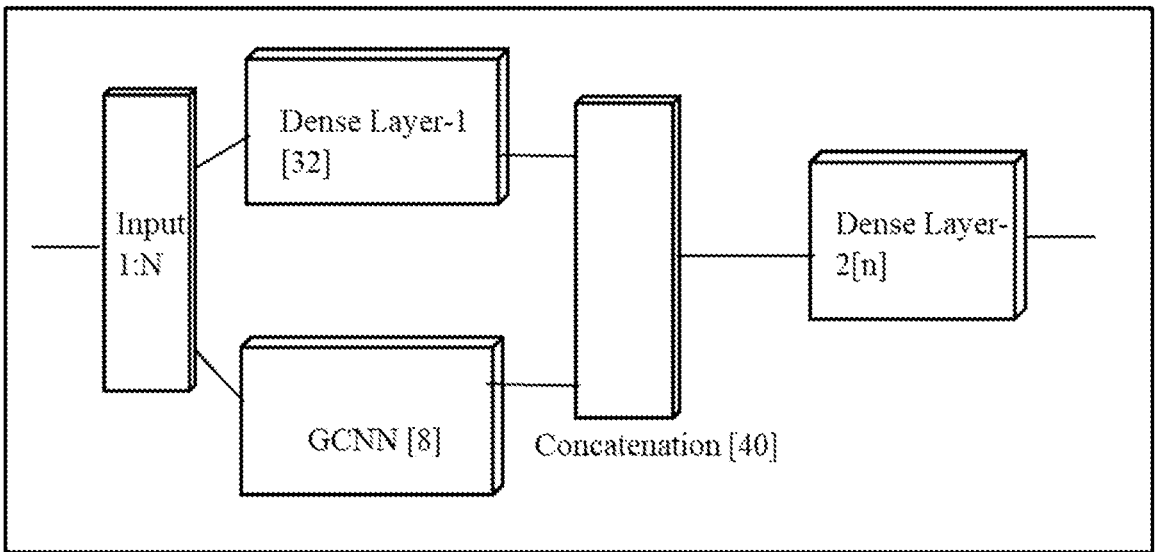
FIG. 6 illustrates a Graph Neural Network (GNN) based self-learning model for auto recommendation of bots for the processor implemented method for ML based integration of bots implemented by the system of FIG. 1 according to some embodiments of the present disclosure.

FIG. 6 illustrates a Graph Convolutional Neural Network (GCNN) based self-learning model for bot auto recommendation for the processor implemented method for ML based integration of bots implemented by the system of FIG. 1 according to some embodiments of the present disclosure. Now referring to FIG. 6, a vectorized form of training data is fed to input Layer. The dense Layer-1 computes dot product of input layer and adjacency matrix to get output of 32 branches (matrix size). The GCNN Layer includes 8 output branches. The concatenation layer is responsible for combining inputs from both Dense Layer-1 and GCNN Layer. The dense layer-2 compresses the matrix to get output variable. Cross entropy loss function is used to keep the weights modification in check to minimize the deviation of predicted output from the true output. Cross-entropy loss function=

$$\sum\nolimits_{i=i}^{n} Yi\log(pi)$$

for n classes; Yi: True output class and, pi: Probability for $i^{th}$ class

Experimentation Details

In an embodiment, the present disclosure is experimented as to solve a pain-area in procurement process. The procurement process in the manufacturing industry is the series of processes that are essential to get products or services from requisition to purchase order and invoice approval. Each organization has their own set of processes for procurement. Despite the uniqueness, all procurement processes include the hassle of paperwork which needs to be done manually. This can in turn lead to increased operational costs. However, the process of dealing with Direct-Indirect Procurement process was simplified using the present disclosure. The experimentation includes multiple bots for different categories like OCR, Enterprise Resource Planning (ERP) and Information Technology Service Management (ITSM). Invoices received during procurement are downloaded from emails and posted within the ERP system based on the invoice data. It also handles exceptions by raising a ticket in the ITSM system in order to expedite the process. The bots in this combination will be Bot1-Invoice Processing, Bot2-Invoice Posting, Bot3-Incident Creation. The input features of bot1 is an invoice in PDF or .doc format. Output features are invoice number of integer data type, date of string data type, amount of integer data type, company name of string data type. Bot-2 has input features namely company name of string data type, invoice number of integer data type, amount of integer data type and date of string data type and output features of document reference number of string data type and the description of invoice posting as string data type. Bot-3 has input features of incident description of string data type and output feature of incident number of integer data type. Technical and end-use feasibility is checked for Bot-1 and Bot-2 as described previously. Then for Bot-2 and Bot-3. Using this, the procurement process was simplified without having to code from scratch and reduced the time for development.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of ML based integration of bots. The present disclosure provides a holistic solution by integrating a plurality of similar or dissimilar bots. Here, the end-user can create, validate and test developed solution, all at a single place. Further, the end-users can curate software solutions as per their requirements and try out combinations of bots from the available catalogue. Further, the present disclosure provides support for the entire development lifecycle of a software solution. Furthermore, the present disclosure is flexible and scalable for dynamic requirements.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, at least two bots selected by a user from a bot repository as input, wherein each bot comprises a plurality of bot features;

computing, by the one or more hardware processors, an end-user bot compatibility value for the at least two bots based on a corresponding plurality of bot features using a trained classifier, wherein the end-user compatible value is set to one only if the corresponding end-user bot compatibility score is greater than a predefined threshold;

generating, by the one or more hardware processors, a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots;

updating, by the one or more hardware processors, a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise; and creating, by the one or more hardware processors, a bot package by integrating the at least two bots based on the dynamic compatibility matrix, wherein the bot package is created only if a corresponding entry between the at least two bots in the dynamic compatibility matrix is set to one.

2. The processor implemented method of claim 1, wherein the method of training the classifier for computing the end-user compatibility value of the at least two bots comprises:

receiving a plurality of bot features corresponding to each of a plurality of bots stored in the bot repository;

generating a preprocessed plurality of bot features corresponding to each of the plurality of bots using a preprocessing technique;

generating a plurality of vectorized bot features associated with each of the plurality of bots based on a corresponding preprocessed plurality of bot features using a vectorization technique;

generating a plurality of bot combinations based on the plurality of bots using a permutation combination technique; and training the classifier based on the plurality of vectorized bot features associated with each of the plurality of bots and the plurality of bot combinations, wherein the classifier is trained to compute a compatibility score between each of the plurality of bot combinations.

3. The processor implemented method of claim 1, wherein the plurality of bot features comprises a bot name, the plurality of input features, the plurality of output features, a datatype associated with each of the plurality of input features, a datatype associated with each of the plurality of output features and a bot category.

4. The processor implemented method of claim 1, further comprises auto recommending a plurality of bots to the user using a Graph Neural Network (GNN) based self-learning model, wherein the GNN based self-learning model is associated with the dynamic compatibility matrix further comprising compatibility values of the plurality of bots.

5. The processor implemented method of claim 1, wherein the created bot package is included in the bot repository.

6. A system comprising:

at least one memory storing programmed instructions; one or more Input/Output (I/O) interfaces; and one or more hardware processors operatively coupled to the at least one memory, wherein the one or more hardware processors are configured by the programmed instructions to:

receive at least two bots selected by a user from a bot repository as input, wherein each bot comprises a plurality of bot features;

compute an end-user bot compatibility value for the at least two bots based on a corresponding plurality of bot features using a trained classifier, wherein the end-user compatible value is set to one only if the corresponding end-user bot compatibility score is greater than a predefined threshold;

generate a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots;

update a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise; and create a bot package by integrating the at least two bots based on the dynamic compatibility matrix, wherein the bot package is created only if a corresponding entry between the at least two bots in the dynamic compatibility matrix is set to one.

7. The system of claim 6, wherein the method of training the classifier for computing the end-user compatibility value of the at least two bots comprises:

receiving a plurality of bot features corresponding to each of a plurality of bots stored in the bot repository;

generating a preprocessed plurality of bot features corresponding to each of the plurality of bots using a preprocessing technique;

generating a plurality of vectorized bot features associated with each of the plurality of bots based on a corresponding preprocessed plurality of bot features using a vectorization technique;

generating a plurality of bot combinations based on the plurality of bots using a permutation combination technique; and training the classifier based on the plurality of vectorized bot features associated with each of the plurality of bots and the plurality of bot combinations, wherein the classifier is trained to compute a compatibility score between each of the plurality of bot combinations.

8. The system of claim 6, wherein the plurality of bot features comprises a bot name, the plurality of input features, the plurality of output features, a datatype associated with each of the plurality of input features, a datatype associated with each of the plurality of output features and a bot category.

9. The system of claim 6, further comprises auto recommending a plurality of bots to the user using a Graph Neural Network (GNN) based self-learning model, wherein the GNN based self-learning model is associated with the dynamic compatibility matrix further comprising compatibility values of the plurality of bots.

10. The system of claim 6, wherein the created bot package is included in the bot repository.

11. One or more non-transitory machine-readable information storage mediums comprising one or more instructions which when executed by one or more hardware processors cause:

receiving at least two bots selected by a user from a bot repository as input, wherein each bot comprises a plurality of bot features;

computing an end-user bot compatibility value for the at least two bots based on a corresponding plurality of bot features using a trained classifier, wherein the end-user compatible value is set to one only if the corresponding end-user bot compatibility score is greater than a predefined threshold;

generating a technical compatibility value of the at least two bots based on a plurality of input features and a plurality of output features associated with the at least two bots, wherein the technical compatibility value is set to one only if the plurality of output features of a first bot from among the at least two bots is equal to the plurality of input features associated with the second bot from among the at least two bots;

updating a dynamic compatibility matrix with the at least two bots based on the end-user bot compatibility value and the technical compatibility value, wherein the dynamic compatibility matrix is updated with a value one if the end-user compatibility value and the technical feasibility value are set to one and zero otherwise; and creating a bot package by integrating the at least two bots based on the dynamic compatibility matrix, wherein the bot package is created only if a corresponding entry between the at least two bots in the dynamic compatibility matrix is set to one.

12. The one or more non-transitory machine-readable information storage mediums of claim 11, wherein the method of training the classifier for computing the end-user compatibility value of the at least two bots comprises:

receiving a plurality of bot features corresponding to each of a plurality of bots stored in the bot repository;

generating a preprocessed plurality of bot features corresponding to each of the plurality of bots using a preprocessing technique;

generating a plurality of vectorized bot features associated with each of the plurality of bots based on a corresponding preprocessed plurality of bot features using a vectorization technique;

generating a plurality of bot combinations based on the plurality of bots using a permutation combination technique; and training the classifier based on the plurality of vectorized bot features associated with each of the plurality of bots and the plurality of bot combinations, wherein the classifier is trained to compute a compatibility score between each of the plurality of bot combinations.

13. The one or more non-transitory machine-readable information storage mediums of claim 11, wherein the plurality of bot features comprises a bot name, the plurality of input features, the plurality of output features, a datatype associated with each of the plurality of input features, a datatype associated with each of the plurality of output features and a bot category.

14. The one or more non-transitory machine-readable information storage mediums of claim 11, wherein the one or more instructions which when executed by the one or more hardware processors further cause compatibility values of the plurality of bots.

15. The one or more non-transitory machine-readable information storage mediums of claim 11, wherein the created bot package is included in the bot repository.

* * * * *